May 12, 1970 — P. C. KESLING — 3,510,946
ORTHODONTIC APPLIANCE
Filed Feb. 28, 1969 — 2 Sheets-Sheet 1

INVENTOR
PETER C. KESLING
BY
Kinzer, Dorn & Zickert
ATTORNEYS

May 12, 1970    P. C. KESLING    3,510,946
ORTHODONTIC APPLIANCE

Filed Feb. 28, 1969    2 Sheets-Sheet 2

INVENTOR
PETER C. KESLING

BY
Kinzer, Dorn & Zickert
ATTORNEYS

United States Patent Office 3,510,946
Patented May 12, 1970

3,510,946
ORTHODONTIC APPLIANCE
Peter C. Kesling, Green Acres, La Porte, Ind. 46350
Filed Feb. 28, 1969, Ser. No. 803,181
Int. Cl. A61c 7/00
U.S. Cl. 32—14                                10 Claims

ABSTRACT OF THE DISCLOSURE

Orthodontic appliance in the form of a molded, arch-shaped device of resilient material for engagement with one or both of the arches of a person and including impressions of the teeth for urging the teeth into preselected positions, wherein rigid means is molded into the body of resilient material for engagement with at least one of the labial or lingual surfaces of a tooth to provide better retention of one or more teeth and to enhance proper positioning or orientation of the appliance relative to the teeth.

---

This invention relates in general to an orthodontic appliance of the type often referred to as a tooth positioning appliance or tooth positioner for providing orthodontic treatment to a person, and more particularly to a tooth positioning appliance of the type having an arch-shaped body of resilient material with impressions of teeth for at least one of the arches and being arranged to urge teeth into preselected positions and including rigid insert means anchored in the impressions to conform with one or more surfaces of the teeth and provide better retention of a tooth so engaged.

Tooth positioning appliances are well known in the field of orthodontics for applying orthodontic treatment, usually during the last stage of treatment. These appliances are custom made and molded of resilient material, such as a suitable rubber or plastic. The appliance includes impressions of teeth arranged to urge teeth into preselected positions. Exemplary of the type of appliance referred to is that disclosed in the U.S. Pat. No. 2,531,222.

Various problems arise during the treatment of persons due to the various positions of teeth that require-movement in a particular fashion to a preselected position. For example, it may be necessary to torque or rotate a tooth a considerable amount, so that it will be in the desired position. Once the tooth has been moved to the desired position, it is necessary to retain it in that position for a period of time in order that it be permanently set and to prevent it from reverting back to its original position. The problem arises following removal of the usual appliances that are in the form of bands, brackets and wires. The tooth positioning appliance serves upon removal of the regular appliances to further urge teeth into predetermined positions, and to retain teeth in particular positions until they have been permanently set. The heretofore employed tooth positioning appliance of the type disclosed in the aforesaid patent has been found inadequate for proper retention in certain instances especially where a tooth has been moved a considerable amount from its original position. This problem is generally encountered with the incisor teeth, although it may occasionally be encountered with any of the teeth.

The present invention relates to an improved tooth positioning appliance that is especially capable of obviating the above named difficulties, and which includes in the molded teeth impressions rigid insert means conforming to and engaging at least one surface of a tooth and performing to provide better retention properties than the usual tooth positioning appliance and a better, more positive transmission of force from the appliance to the tooth. The rigid insert means may be made of metal, such as stainless steel, or a suitable hard plastic, such as acrylic, nylon or the like. The insert may take the form of a plate shaped to engage one of the labial or lingual surfaces of a tooth or both of the surfaces. Where it is formed to engage only one of the surfaces, it may additionally have an extension that would conformingly fit and engage over at least part of the occlusal surface of the tooth. The plate would preferably extend substantially along the entire tooth surface mesial-distally, and between the gingival and occlusal extremities. Where the insert would be arranged to engage opposing lingual and labial surfaces of a tooth and thereby including opposing plate-like portions, the plate-like portions may be independent of one another or interconnected by a bridge that would extend across the occlusal surface of the tooth. Where a portion of the insert would extend over at least a portion of the occlusal surface of a tooth, it would also function to inhibit biting through the positioner. Any number of rigid inserts may be employed in the tooth positioner depending upon the need.

Accordingly, it is an object of the present invention to provide an improved tooth positioner capable of obtaining better retention of teeth during orthodontic treatment.

Another object of this invention is in the provision of a tooth positioning appliance having rigid inserts anchored in the appliance and conforming to surfaces of a tooth in order to provide better retention of the tooth engaged thereby, and to enhance proper positioning or orientation of the positioner relative the teeth.

Still another object of this invention resides in the provision of a tooth positioning appliance having tooth-conforming rigid inserts that inhibit biting through by the wearer.

Other objects, features and advantages of the invention will be apparent from the following detailed disclosure, taken in conjunction with the accompanying sheet of drawing, wherein like reference numerals refer to like parts, in which.

Figure 1:
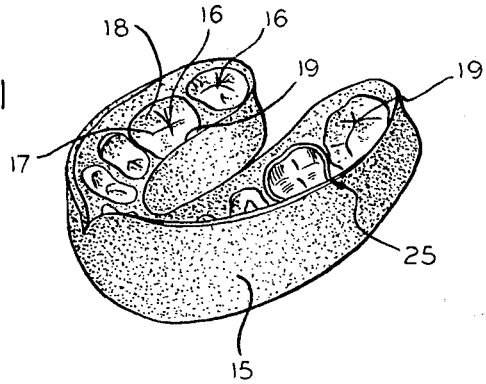
FIG. 1 is a perspective view of a tooth positioning appliance according to the present invention.
Figure 2:
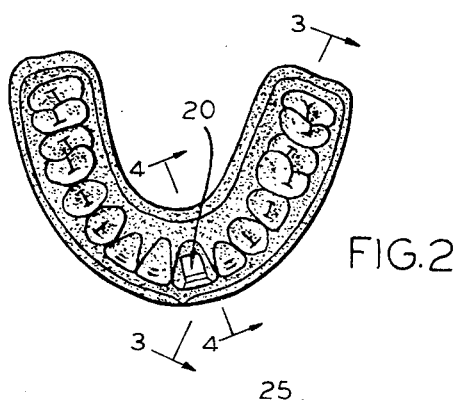
FIG. 2 is a top plan view of the tooth positioning appliance of FIG. 1.
Figure 3:
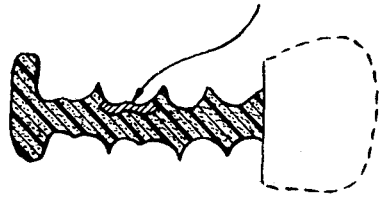
FIG. 3 is a partial longitudinal sectional view taken through the tooth positioning appliance and substantially along line 3—3 of FIG. 2.

The tooth positioning appliance of the present invention in general includes a molded arch-shaped body 15 of resilient material and adapted to be custom fit for the mouth of a person to be employed between the upper and lower arches. This appliance is molded of a durable, resilient material that is capable of enduring the biting action of the mouth that is usually performed in the wearing of the appliance. For example, the resilient material may be of specially prepared rubber or a specially prepared plastic, either of which when cured would have the desired elastic properties. The body includes a plurality of teeth impressions 16 that have been arranged to engage and urge at least some of the teeth of the user into preselected positions. An appliance may include impressions of all or some of the teeth of either or both arches. As already mentioned, the appliance would be of the general type disclosed in U.S. Pat. No. 2,531,222.

Each impression 16 includes a bottom 17, a labial wall 18 and a lingual wall 19. The bottom as well as the labial and lingual walls are molded to conform and fit snugly with respect to the occlusal surface, labial surface and lingual surface of each respective tooth.

It has been found that use of a tooth positioning appliance in the final stage of treatment following removal of the brackets has not always been satisfactory, especially in situations where during the initial stages of treatment a tooth has been rotated a considerable amount. In such cases, such a tooth would have a tendency to revert back to its original position regardless of the action of the tooth positioning appliance. The present invention provides rigid inserts in the resilient appliance that serve to provide better retention and more positive transmission of force from the appliance to the teeth than can be obtained through the resilient body of the positioner.

Figure 4:
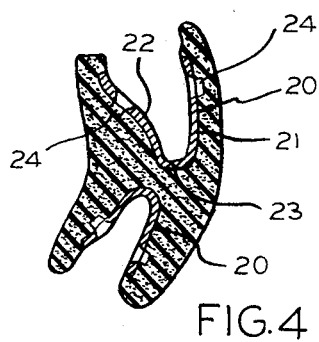
FIG. 4 is an enlarged transverse sectional view taken substantially along line 4—4 of FIG. 2.

In order to provide better retention of a tooth, in accordance with the present invention, a rigid insert such as the insert 20, FIG. 4, is anchored to the resilient body in the making of the appliance. The insert 20 is of a suitable rigid material and adapted for conforming to an incisor tooth, and includes a labial portion 21, a lingual portion 22, and an interconnecting portion 23. The labial portion is shaped to conform to the labial surface of the tooth for a given impression, while the lingual portion is shaped to conform to the lingual surface of the tooth. The interconnecting portion 23 is formed to fit over the occlusal surface of the tooth. Anchoring wings 24 of any desired number may extend from the labial and lingual portions and into the body of the appliance to anchor the insert in place. The mesial-distal dimension of the labial portion 21 or the lingual portion 22 is substantially equal to the entire mesial-distal dimension of the corresponding tooth surface. The occlusal-gingival dimension of the portions is substantially equal to the entire occlusal-gingival dimension of the corresponding tooth surface.

Figure 6:
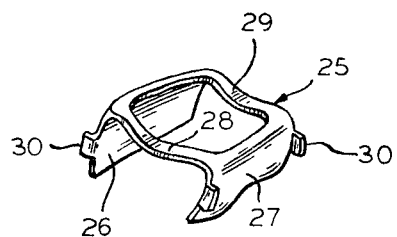
FIG. 6 is a perspective view of another rigid insert as it appears prior to being molded into the tooth positioning appliance and particularly to an insert for use on molars and as it appears prior to being molded in the resilient appliance.
Figure 5:
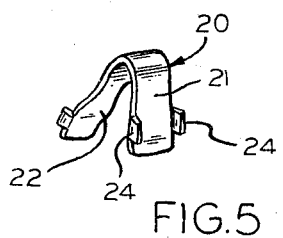
FIG. 5 is a perspective view of a rigid insert as it appears prior to being molded in the tooth positioning appliance according to the invention, and particularly relating to the embodiment shown in FIG. 4.

FIG. 6 illustrates a rigid insert 25 adapted to conform to a molar tooth, and which includes a labial portion 26, a lingual portion 27, and interconnecting bridge portions 28 and 29. As in the embodiment of FIGS. 4 and 5, the labial portion 26 is shaped to conform to the labial surface of a molar, while the lingual portion 27 is shaped to conform with the lingual surface of the molar. The interconnecting bridge portions 28 and 29 conform to the occlusal surface of the tooth and also serve in this case to define the insert as a clamp that clampingly engages the molar. Anchoring wings 30 serve to extend into the resilient body of the appliance and anchor the insert in place. The labial and lingual portions are sized to extend mesial-distally along substantially the entire labial and lingual tooth surfaces, and between the gingival and occlusal extremities thereof.

Figure 7:
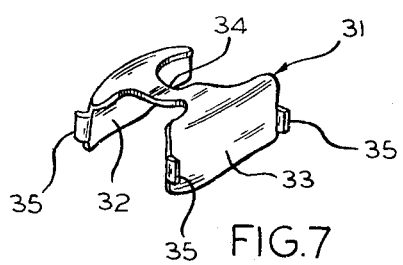
FIG. 7 is a perspective view of a modified rigid insert for use on molars and as it appears prior to being molded in the resilient appliance.

A modified molar insert 31 is shown in FIG. 7 that includes a labial portion 32, a lingual portion 33 as in the embodiment of FIG. 6, but differs therefrom in only having a single bridge connecting portion 34 extending between the labial and lingual portions. Anchoring tabs 35 extend from the labial and lingual portions.

Figure 8:
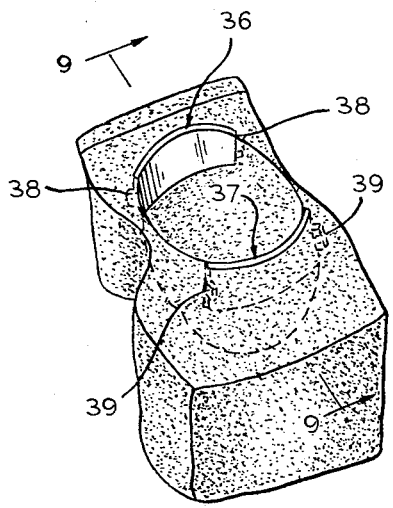
FIG. 8 is a fragmentary top perspective view of a tooth positioning appliance illustrating a modified rigid insert constructon.
Figure 9:
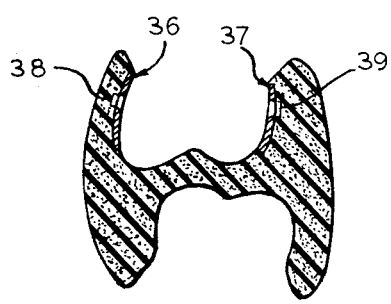
FIG. 9 is a transverse sectional view taken through a modification of FIG. 8 and substantially along line 9—9 thereof.

Referring now to the embodiment of FIGS. 8 and 9, the rigid insert for a single tooth is defined by a pair of opposed strap-like members 36 and 37, independent from one another, and shaped to conform to the labial and lingual surfaces of a tooth. Anchoring tabs 38 are provided for the insert section 36, while anchoring tabs 39 are provided for the insert section 37. These insert sections, while extending along substantially the entire mesial-distal surfaces of the tooth, are rather narrow in width and do not extend the entire distance between the gingival and occlusal extremities. It should be appreciated that only a single section may be employed in some instances instead of the opposed sections 36 and 37.

Figure 10:
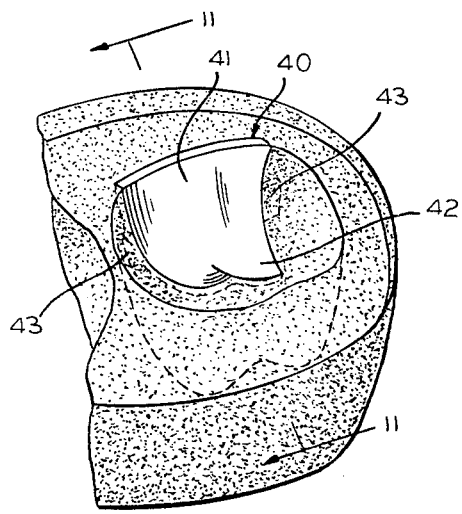
FIG. 10 is a fragmentary top perspective view of an appliance having a still further modified rigid insert.
Figure 11:
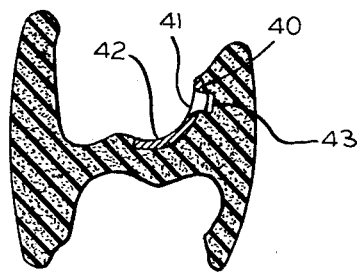
FIG. 11 is a transverse sectional view taken through the modification of FIG. 10 and substantially along line 11—11 thereof.

The embodiment of FIGS. 10 and 11 differs from the other embodiments in that the insert 40 includes a gingival-occlusally extending portion 41 that extends substantially the entire distance of one of the labial or lingual surfaces of a tooth between the gingival and occlusal extremities, as well as along substantially the entire surface mesial-distally. Integral with the portion 41 is an occlusally engaging portion 42 that fits over at least part of the occlusal surface of the tooth. As in the other embodiments, the insert would be completely shaped to conform to the shape of the tooth surface it is to engage. The portion 42 would inhibit biting through the positioner. Anchoring tabs 43 are provided in extending relation from the portion 41 to embed in the body of the appliance and firmly anchor the insert in place. While only a single insert is shown for one side of the tooth, it should be appreciated that a second insert could be provided for the opposite side and still not be interconnected thereto across the occlusal surface of the tooth.

It will be understood that modifications and variations may be effected without departing from the scope of the novel concepts of the present invention.

The invention is hereby claimed as follows:

1. An orthodontic appliance comprising a molded arch-shaped body of resilient material, said body being formed to fit within the mouth of a person between the upper and lower arches, said body including impressions of teeth of at least one of the arches arranged to urge at least some teeth into preselected positions, said impressions having a bottom and opposing labial and lingual walls, and means substantially more rigid than said resilient material anchored in at least one of the walls and at least partially conforming to and engaging an opposing tooth surface and extending mesial-distally along substantially the entire tooth surface between the gingival and occlusal extremities thereof.

2. An orthodontic appliance as defined in claim 1, wherein said means includes an extension engaging over at least a part of the occlusal surface of the tooth.

3. An orthodontic appliance as defined in claim 1, wherein said means includes portions anchored in said opposed labial and lingual walls and conforming to and engaging opposing tooth surfaces.

4. An orthodontic appliance as defined in claim 3, and interconnecting means between said labial and lingual portions extending over and conforming to the occlusal surface of the corresponding tooth.

5. An orthodontic appliance as defined in claim 1, wherein said means is of metal.

6. An orthodontic appliance as defined in claim 1, wherein said means is of plastic.

7. An orthodontic appliance comprising a molded arch-shaped body of resilient material, said body being formed to fit within the mouth of a person between the upper and lower arches, said body including impressions of teeth of the arches arranged to urge at least some teeth into pre-selected positions, said impressions having a bottom adapted to engage the occlusal surface of a tooth and opposing labial and lingual walls adapted to engage the labial and lingual surfaces of a tooth, and rigid insert means of a material substantially more rigid than said resilient material anchored in at least one of the walls of an impression end engaging the corresponding opposing tooth surface, said rigid insert means being shaped to conform to the corresponding opposing tooth surface.

8. An orthodontic appliance as defined in claim 6, and said rigid insert means extending over at least a part of the occlusal surface of the corresponding tooth.

9. An orthodontic appliance as defined in claim 7, wherein said rigid insert means is formed to fit over the labial, lingual and occlusal surfaces of a tooth.

10. An orthodontic appliance as defined in claim 7, wherein said rigid insert means includes portions fitting over the labial and lingual portions of a tooth and interconnecting bridge means extending between said portions at the occlusal surface of the tooth.

References Cited

UNITED STATES PATENTS

| | | | |
|---|---|---|---|
| 2,789,351 | 4/1957 | Gordon | 32—14 |
| 3,223,085 | 12/1965 | Gores et al. | 128—136 |

ROBERT PESHOCK, Primary Examiner

UNITED STATES PATENT OFFICE
CERTIFICATE OF CORRECTION

Patent No. 3,510,946      Dated  May 12, 1970

Inventor(s)  Peter C. Kesling

It is certified that error appears in the above-identified patent and that said Letters Patent are hereby corrected as shown below:

Col. 1, line 43, delete the hyphen (-) at the end of the line; and
Col. 4, line 75, change "end" to --and--.

Signed and sealed this 5th day of November 1974.

(SEAL)
Attest:

McCOY M. GIBSON JR.
Attesting Officer

C. MARSHALL DANN
Commissioner of Patents